United States Patent [19]

Ikeda et al.

[11] Patent Number: 5,583,852
[45] Date of Patent: Dec. 10, 1996

[54] WIRELESS DATA COMMUNICATION SYSTEM

[75] Inventors: Ken Ikeda, Tokyo; Kenichi Takahashi; Minako Takeishi, both of Kawasaki, all of Japan

[73] Assignee: Matsushita Electric Industrial Co., Ltd., Japan

[21] Appl. No.: 360,620

[22] Filed: Dec. 21, 1994

[30] Foreign Application Priority Data

Dec. 22, 1993 [JP] Japan ................................ 5-325071
Dec. 12, 1994 [JP] Japan ................................ 6-307392

[51] Int. Cl.$^6$ .......................................... H04Q 11/04
[52] U.S. Cl. ........................... 370/335; 375/206; 342/146
[58] Field of Search ........................ 370/18, 85.2, 85.3, 370/69.1; 375/200, 205, 206; 455/34.1, 34.2, 56.1, 89

[56] References Cited

U.S. PATENT DOCUMENTS

| | | | |
|---|---|---|---|
| 4,164,628 | 8/1979 | Ward et al. ............................ | 375/206 |
| 4,383,315 | 5/1983 | Torng ................................... | 370/85.2 |
| 4,765,753 | 8/1988 | Schmidt ................................ | 370/18 |
| 4,845,726 | 7/1989 | Kurihara et al. ...................... | 370/18 |
| 4,901,307 | 2/1990 | Gilhousen et al. .................... | 375/205 |
| 5,295,153 | 3/1994 | Gudmundson ....................... | 370/18 |
| 5,327,419 | 7/1994 | Clark et al. .......................... | 370/85.2 |

FOREIGN PATENT DOCUMENTS 62-233941  10/1987  Japan ................................ H04B 9/00

*Primary Examiner*—Douglas W. Olms
*Assistant Examiner*—Shick Hom
*Attorney, Agent, or Firm*—Rossi & Associates

[57] ABSTRACT

A wireless data communication system comprises: base stations located to have cells arranged equidistantly therebetween; mobile units, each being located within either of the cells, each of the base stations communicating with mobile units within its cell through plural channels provided by FDM. In the system, each of the base station may comprise a detector for monitoring the channels and detecting a free channel, and a transmission portion for continuously transmitting a signal including data indicative of the detected free channel. In the system, the plurality of channels used in one of cells have given frequency bands respectively which are the same as given frequency bands in other cells. In the system, each of the mobile stations may comprise a chip synchronizing circuit for effecting chip synchronizing between the each of the mobile stations and its base station. In that system, a mobile unit having an antenna whose directivity is controllable, measures distances to determine a direction to its base station with measured distances and received distance from other mobile unit. In that system, a channel with an interference is detected and inhibited to be used and data indicative of the channel with the interference may be stored in a memory and the absence of the interference may be detected and the memory is renewed.

6 Claims, 11 Drawing Sheets

WIRELESS DATA COMMUNICATION SYSTEM

BACKGROUND OF THE INVENTION

1. Field of the Invention

This invention relates to a wireless data communication system and particularly to a wireless data communication system for communicating data within a limited space.

2. Description of the Prior Art

A wireless data communication system including at least a cell where a base station and a plurality of mobile units are provided is known. As a such wireless data communication system, a space transmission module is disclosed in Japanese patent application provisional publication No.62-233841. FIG. 13 is a block diagram of the prior art space transmission module. Numeral 13 is a coaxial cable, numeral 14 is a termination circuit, numeral 15 is a terminal equipment, numeral 16 is a satellite, and a numeral 17 is a terminal.

A signal from the terminal equipment is transmitted into the space by the terminal 17 comprising a photoelectric conversion element or an antenna. A satellite 16 receives the transmitted signal from the terminal 17 and converts it into an electric signal and supplies it to the coaxial cable 13 and detects a signal from the coaxial cable 13 and transmits the detected signal to the space. Then, the terminal 17 receives the signal from the satellite 16 and converts it by the photoelectric conversion element or the like and supplies it to the terminal equipment 15. The satellite 16 compares the signal supplied to the coaxial cable 13 with the signal from the coaxial cable 13 to detect a collision of the signal supplied to the coaxial cable 13 with signals from more than one other satellites 16 at the same time. If the satellite 16 detects the collision, it transmits a collision signal to the terminal 17. The terminal 17 receives the collision signal and informs of the collision to the terminal equipment 15. If the satellite 16 detects no collision, the satellite transmits the signal from the coaxial cable to the terminal 17. The terminal 17 further compares the received signal from the coaxial cable and the transmitted signal to detects a collision. As mentioned, in the prior art space transmission module, the terminal equipment 15 effects communication with the collision prevented.

However, in the above-mentioned carrier sensitive multiple access with collision detection (CSMA/CD) system, there is a problem that the carrier sensing cannot be effected due to a variation in the magnitude of the received signal by the multipath phasing by reflection and scattering in a room or a shadow phasing by the movement of a human body.

SUMMARY OF THE INVENTION

The aim of the present invention is to provide an improved wireless data communication system.

According to the present invention there is provided a wireless data communication system, comprising a plurality of base stations located to have cells arranged equidistantly therebetween respectively; a plurality of mobile units, each being located within either of the cells, each of the base stations communicating with mobile units located within the either of the cells through a plurality of channels provided by frequency division multiplex.

In the wireless data communication system as mentioned, each of the base station comprises: a detection circuit for monitoring the plurality of channels and detecting a free channel; and a transmission circuit for continuously transmitting a signal including data indicative of the detected free channel.

In the wireless data communication system, the plurality of channels used in one of cells have predetermined frequency bands respectively which are the same as predetermined frequency bands in other cells.

In the wireless data communication system, each of the plurality of mobile stations comprises a chip synchronizing circuit for effecting chip synchronizing between one of the base station within which each of the plurality of mobile station is located.

In the wireless data communication system, each of base stations comprises a first spread spectrum coding modulation signal generation circuit for generating and transmitting a first spread spectrum coding modulation signal within respective channels and each of the plurality of mobile stations comprises: a transmitting and receiving unit for transmitting and receiving the spread spectrum coding modulation signal and changing a directivity in receiving and transmitting the spread spectrum coding modulation signal, having a spread spectrum coding modulation signal demodulating circuit for demodulating the spread spectrum coding modulation signal; and a second spread spectrum coding modulation signal generation circuit for generating and transmitting a second spread spectrum coding modulation signal; a measuring portion for measuring a first distance from the base station in one of the cells and a second distance from one other mobile unit within the same one of the cells within which each of the plurality of mobile unit is located using the transmitting and receiving unit; a first control circuit for transmitting the first distance to the one other mobile unit through the signal, transmitting a request signal indicative of requesting a third distance between one other mobile unit and the base station in one of the cells through the signal, and receiving the third distance through the receiving unit; a calculating circuit for calculating a direction of one of base station in one of the cells in accordance with the measured first and second distances and the received third distance; and a second control circuit for controlling the directivity in accordance with the calculated direction.

In the wireless data communication system, each of the base stations comprises: a detection portion for detecting an interference in one of the plurality of channels; a control portion for controlling of using The plurality of channels such that the detected one of the plurality of channels is not used.

In the wireless data communication system, each of the base station further comprises: a memory for storing data indicative of the detected one of the plurality of channels, the control circuit controlling the using the plurality of channels in accordance with the data stored in the memory; a second detection means for detecting the absence of the interference in one of the plurality of channels; a second control means for renew the data in the memory.

According to the present invention a wireless data communication system comprises: base stations located to have cells arranged equidistantly therebetween; mobile units, each being located within either of the cells, each of the base stations communicating with mobile units within its cell through plural channels provided by FDM (frequency division multiplex). In the system, each of the base station may comprise a detector for monitoring the channels and detecting a free channel, and a transmission portion for continuously transmitting a signal including data indicative of the detected free channel. In the system, the plurality of channels used in one of cells have given frequency bands respectively which are the same as given frequency bands in other cells. In the system, each of the mobile stations may comprise a chip synchronizing circuit for effecting chip synchronizing between each of the mobile stations and its base station. In that system, a mobile unit having an antenna whose directivity is controllable, measures distances to determine a direction to its base station with measured distances and received distance from other mobile unit. In that system, a channel with an interference is detected and inhibited to be used and data indicative of the channel with the interference may be stored in a memory and the absence of the interference may be detected and the memory is renewed.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1A:
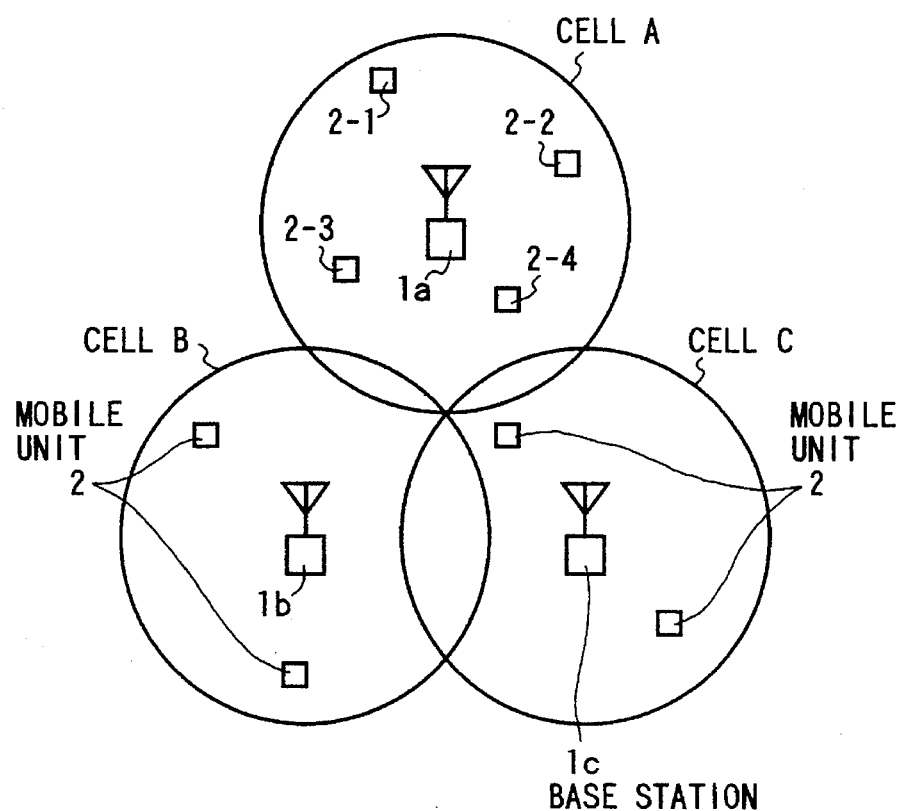
FIG. 1A is an illustration of the first embodiment showing the wireless data communication system.

FIG. 1A is an illustration of the first embodiment showing the wireless data communication system. Base stations 1a to 1c are arranged equidistantly to arrange cells 3a to 3c side by side therebetween. Mobile units 2 are located within either cell.

Figure 1B:
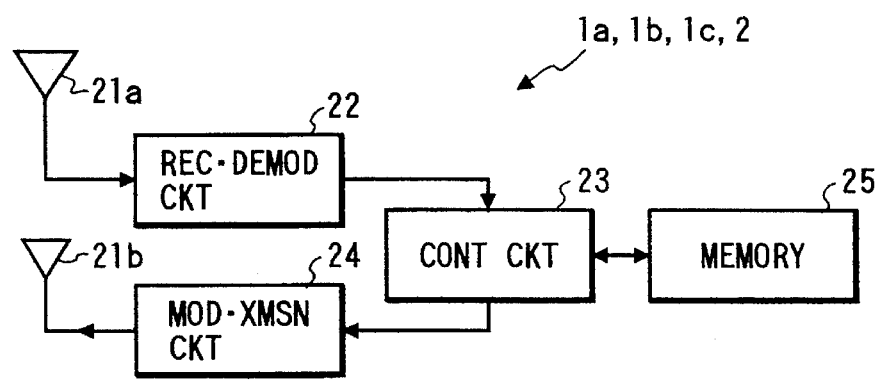
FIG. 1B is a block diagram of the mobile units and the base stations shown in FIG. 1A.

FIG. 1B is a block diagram of the mobile units 2 and the base stations 1a to 1c.

Figure 2:
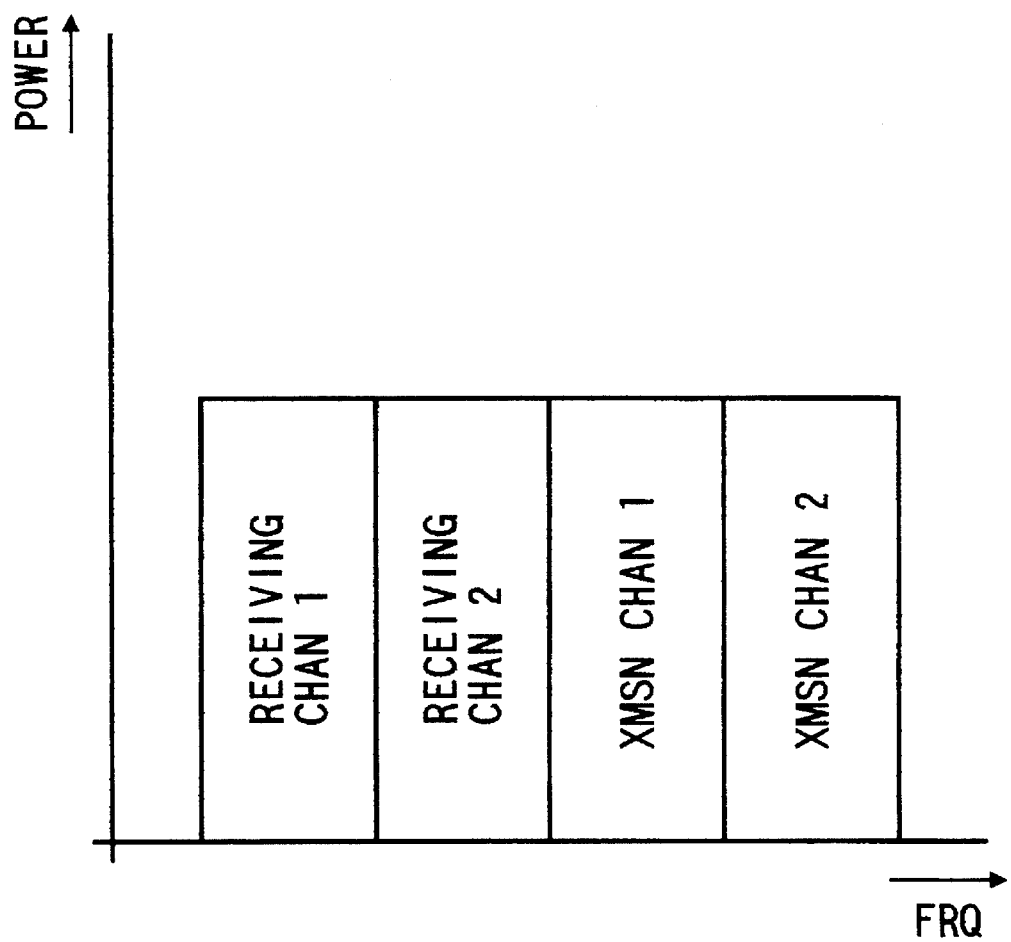
FIG. 2 is a spectrum diagram of the first embodiment of receiving and transmission channels.

FIG. 2 is a spectrum diagram of the first embodiment of receiving and transmission channels.

If the base station 1a in the cell A uses the channel 1, i.e., transmission channel 1 and receiving channel 1, the base station 1b in the cell B uses the second channel, i.e., transmission channel 2 and receiving channel 2 and the base station 1c in the cell C uses the second channel, i.e., transmission channel 3 and receiving channel 3. That is, the channel numbers are assigned to respective cells previously.

Each of them comprises a receiving antenna 21a, a receiving and demodulation circuit 22 for receiving and demodulating a received signal from the antenna 21a, a control circuit 23, comprising a microprocessor, supplied the demodulated signal from the receiving and demodulated circuit 22 for controlling the whole circuits thereof, a transmission antenna 21b, a modulation and transmission circuit 24 for modulating and transmitting data through the antenna 21b, and a memory 25 for storing an operational data or the like. The receiving and transmission antennas 21a and 21b may be replaced with a single antenna.

As mentioned above, according to the first embodiment, the interference from the neighbourhood cell can be reduce by assigning channels frequency-division multiplexed to respective cells previously. Therefore, a reliable wireless data communication system is provided. Moreover, a Code Division Multiple Access (CDMA) method is applicable in this embodiment mentioned later.

Figure 3:
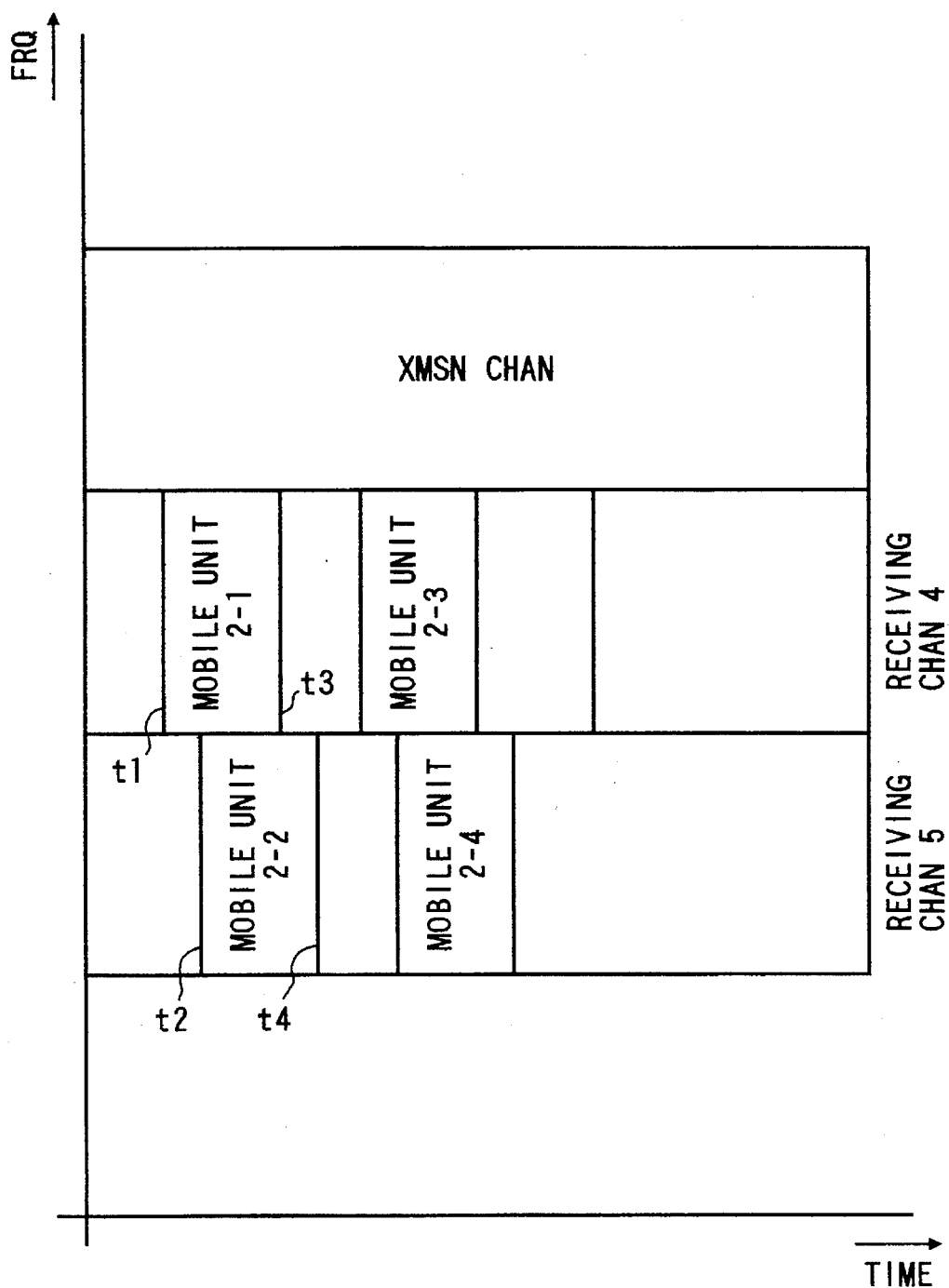
FIG. 3 is a time chart of a second embodiment.
Figure 4:
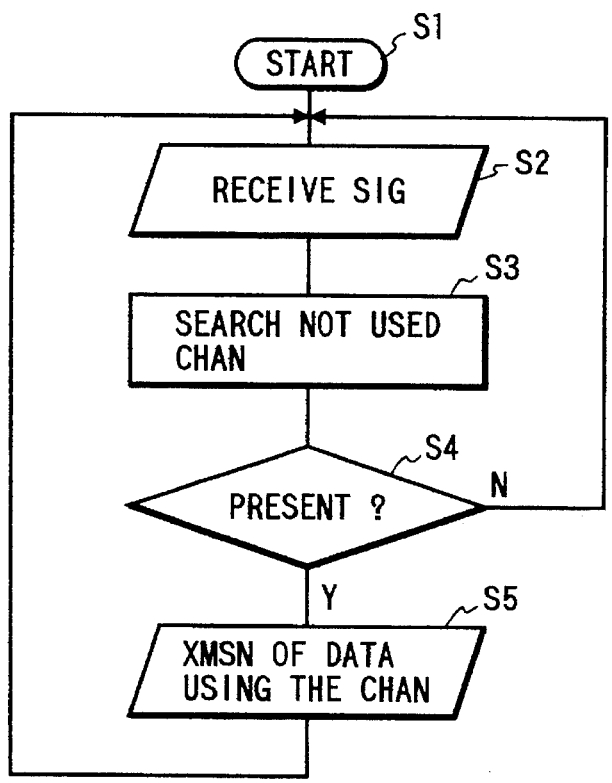
FIG. 4 shows a flow chart of the second embodiment showing an operation of a mobile unit shown in FIG. 1A.
Figure 5:
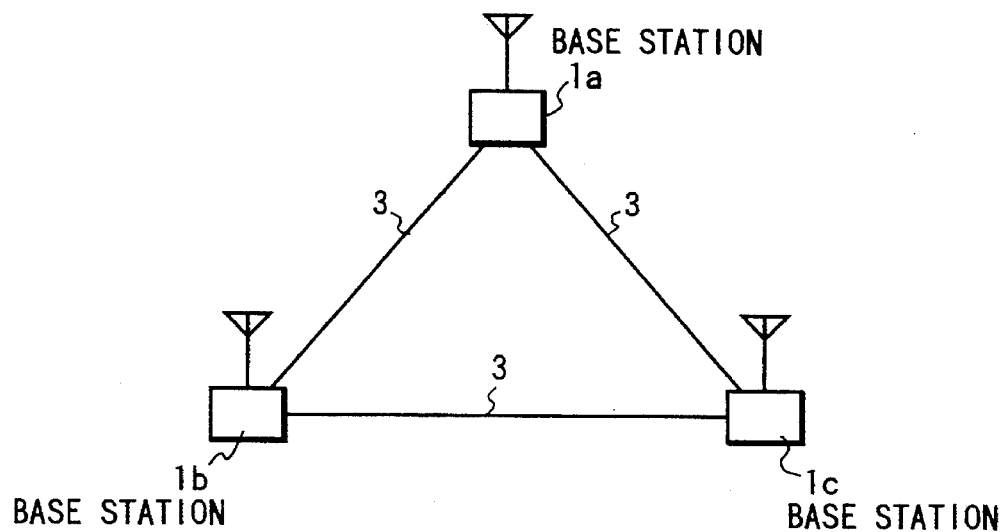
FIG. 5 is an illustration of the second embodiment showing interconnections between the base stations.

A second embodiment will be described with reference to FIGS. 1A, 1B, 3, 4, and 5. FIG. 3 is a time chart of a second embodiment. FIG. 4 shows a flow chart of the second embodiment showing an operation of a mobile unit 2. FIG. 5 is an illustration of the second embodiment showing interconnections between the base stations. Mobile units of this embodiment are shown in FIG. 1A.

The base station 1a transmits a signal to mobile units 2-1 to 2-4. This transmitted signal includes information indicative of a condition of channels currently in use or not used channels. A mobile unit receives the signal and the information in step s2. In step s3, the mobile unit 2 searching a not used channel, or a free channel in accordance the information. In the following step s4, if there is no channel available, processing returns to step s2. In step s4, if there is a channel available, the mobile unit 2 transmits data through the available channel to the base station 1a. That is, as shown in. FIG. 3, the mobile unit 2-1 uses the receiving channel 4 at a timing t1 because both receiving channels are not in use. Then, the base station 1a transmits the information indicating the receiving channel 4 is currently used through the transmission channel. Therefor, the mobile unit 2-2 uses the receiving channel 5 at a timing t2. Just after the timing t2, no mobile unit can transmits data. Then, at a timing t3, the mobile unit 2-1 finishes the communication, so that the receiving channel 4 is free. At a timing t4, both receiving channels are free.

As mentioned, the mobile units 2 uses either of receiving channel 4 or 5 in accordance with the information included in the transmitted signal from the base station 1a.

Moreover, the base stations 1a to 1c are coupled by coaxial cables 3 or the like as shown in FIG. 5 and exchanges the condition of transmission and receiving channels in use with other base stations 1b and 1c to control the frequency channels used at respective cells to reduce the interference from the neighbourhood cells. That is, if the neighbourhood cell B uses the channel 4, the base station 1a transmits the information indicating the channel 4 is not available.

As mentioned above, according to the second embodiment, the base station provides information of currently available channels to the mobile units within its cell and to other neighbourhood base stations, so that a reliable communication is provided if there are a lot of mobile units 2 in the same cell.

A third embodiment will be described with reference to FIGS. 1A, 1B, 2, and 5.

In this embodiment, each base station uses the same frequency division multiplex (FDM) channels as shown in FIG. 2. When the base station 1a uses the channel 1, the base station 1a sends the information indicating the channel 1 is used to the base station 1b. The base station 1b receives the information and then, it uses the channel 2. Similarly, the base station 1c receiving the information used the channel 3.

As mentioned above, according to the third embodiment, plurality channels can be used separately by communicating the information of channels in use among respective base stations 1a to 1c. Therefore, a reliable communication is provided without interference from the neighbourhood cells.

Figure 6:
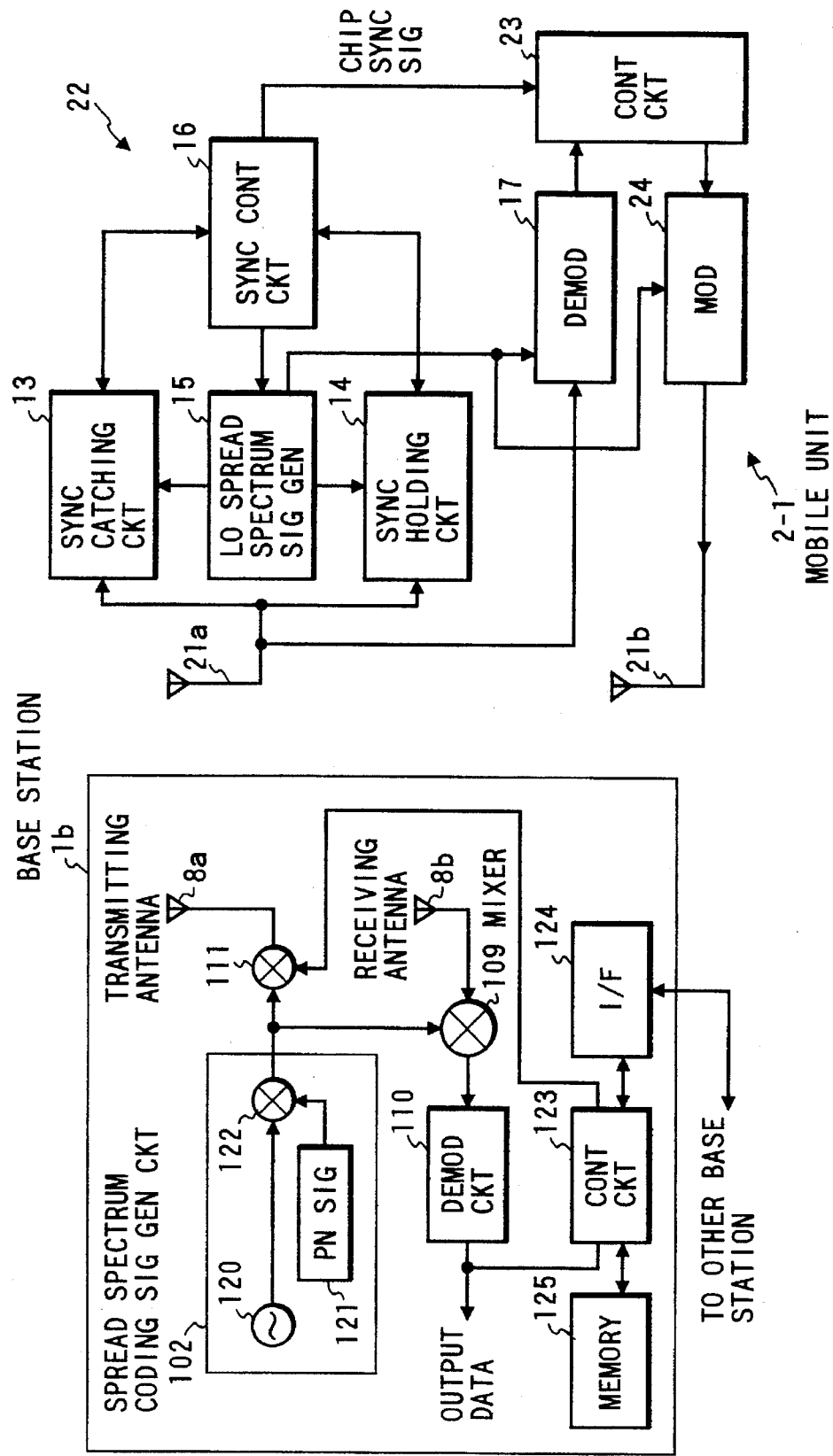
FIG. 6 is a block diagram of a fifth embodiment employing the CDMA method having a chip synchronizing circuit included in the recording and demodulating circuit of a mobile unit shown in FIG. 1A.
Figure 7:
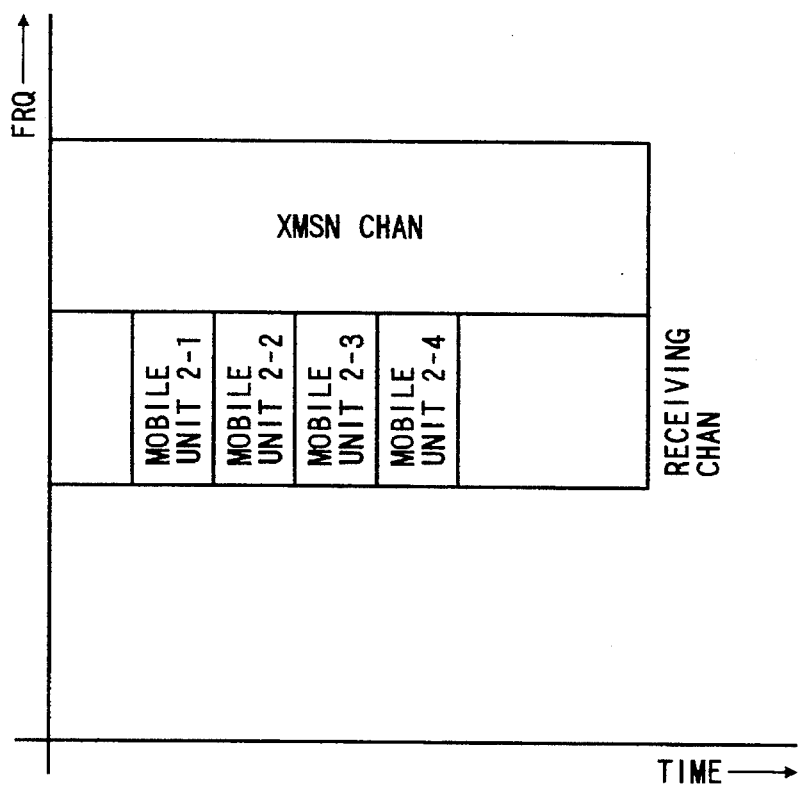
FIG. 7 is a time chart of the fourth embodiment showing transmission and receiving operations.

A fourth embodiment will be described with reference to FIGS. 1A, 1B, 6, and 7. FIG. 6 is a block diagram of a fourth embodiment employing the CDMA method having a chip synchronizing circuit included in the receiving and demodulating circuit 22 of a mobile unit 2-1. FIG. 7 is a time chart of the fourth embodiment showing transmission and receiving operations. In FIG. 6, the base station comprises a spread spectrum coding signal generating circuit 102 for generating a spread spectrum coding signal by spread-spectrum-modulating a carrier signal and a transmitting antenna 8a for transmitting the spread spectrum coding signal. The spread spectrum coding signal generating circuit 102 is provided for the Code Division Multiple Access and has a pseudo noise generation circuit 121 for generating one of plural types of pseudo noise signals, an oscillator 120 for generating a high frequency signal as a carrier signal, a mixer 122 for mixing the carrier signal with the pseudo noise signal to generate a spread spectrum coding signal, and a mixer 111 for mixing the spread spectrum coding signal with a baseband signal including various information, and a transmitting antenna 8a for transmitting the modulated baseband signal to the mobile units 2. A signal received by a receiving antenna 8b is supplied to a mixer 109. The mixer 109 mixes the received signal with the spread signal to effect the Code Division Multiple Accessing. An output of the mixer 109 is supplied to a demodulation circuit 110 to obtain a base band signal. The control circuit 123 receives the demodulated baseband signal from the demodulation circuit 110. The control circuit 123 controls the circuits in the base station 1a and generates and supplies a signal to be transmitted to the mixer 111 and supplies an operational data to other base stations 1b and 1c through an interface circuit 124.

The receiving and demodulation circuit 22 further comprises the synchronizing circuit including: a synchronizing catching circuit 13 comprising a sliding correlation detection circuit or the like, a local spread spectrum signal generation circuit 15, a synchronizing holding circuit 14, a synchronizing control circuit 16, and a demodulation circuit 17. The synchronizing catching circuit 13 obtains a correlation between the local spread spectrum signal and the receiving signal in bit synchronizing and the synchronizing control circuit 16 judges the correlation condition from the output of the synchronizing catching circuit 13 and controls the synchronizing holding circuit 14, having a delayed lock loop circuit or the like, to hold the synchronizing condition and controls the local spread spectrum signal generation circuit 15. The demodulation circuit 17 demodulates the received signal to supply demodulated data using the local spread spectrum signal during the synchronized condition. The synchronizing control circuit 16 supplies the bit synchronizing signal to the control circuit 23.

The control circuits 23 receiving the bit synchronizing signal in respective mobile units 2-1 to 2-4 effect the transmission of data to the base station 1a through one receiving channel with time division as shown in FIG. 7. Here, every mobile units can effects the transmission of data periodically in the predetermined order of the mobile units 2-1 to 2-4 using the bit synchronizing signal. That is, the mobile units 2-1 to 2-4 obtaining the bit synchronization keep an accurate common time base, so that the transmission from each of the mobile units is transferred to the next mobile unit at a high efficiency without interference from other mobile units.

As mentioned above, according to this embodiment, transferring the transmission of one mobile unit to other mobile unit can be done smoothly because the chip synchronizing has been done among the mobile units within the same cell.

Figure 8:
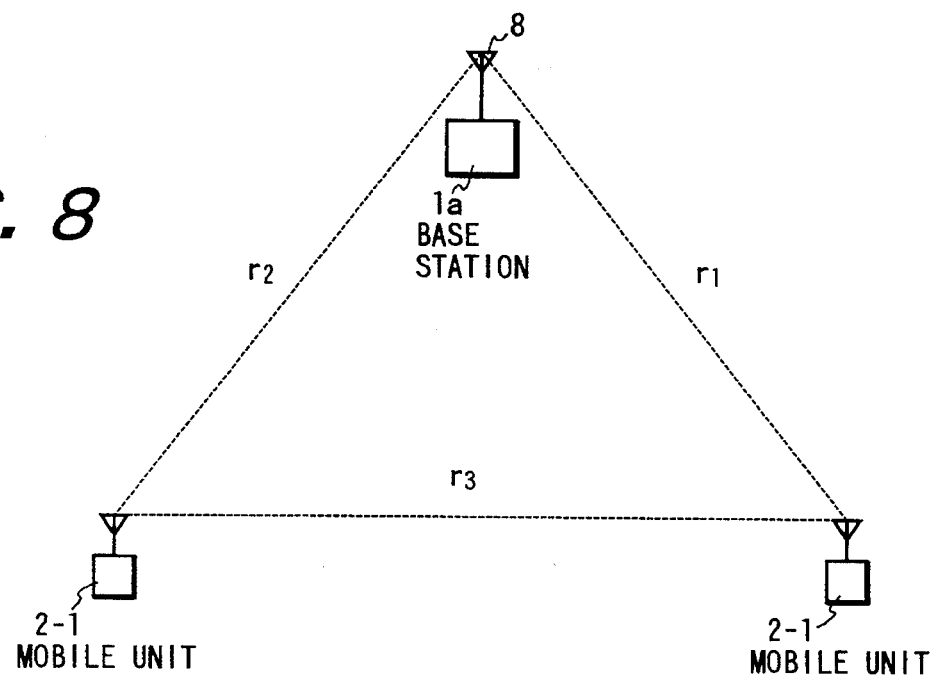
FIG. 8 is an illustration of the sixth embodiment showing a positional relation among the base station and mobile units.
Figure 9:
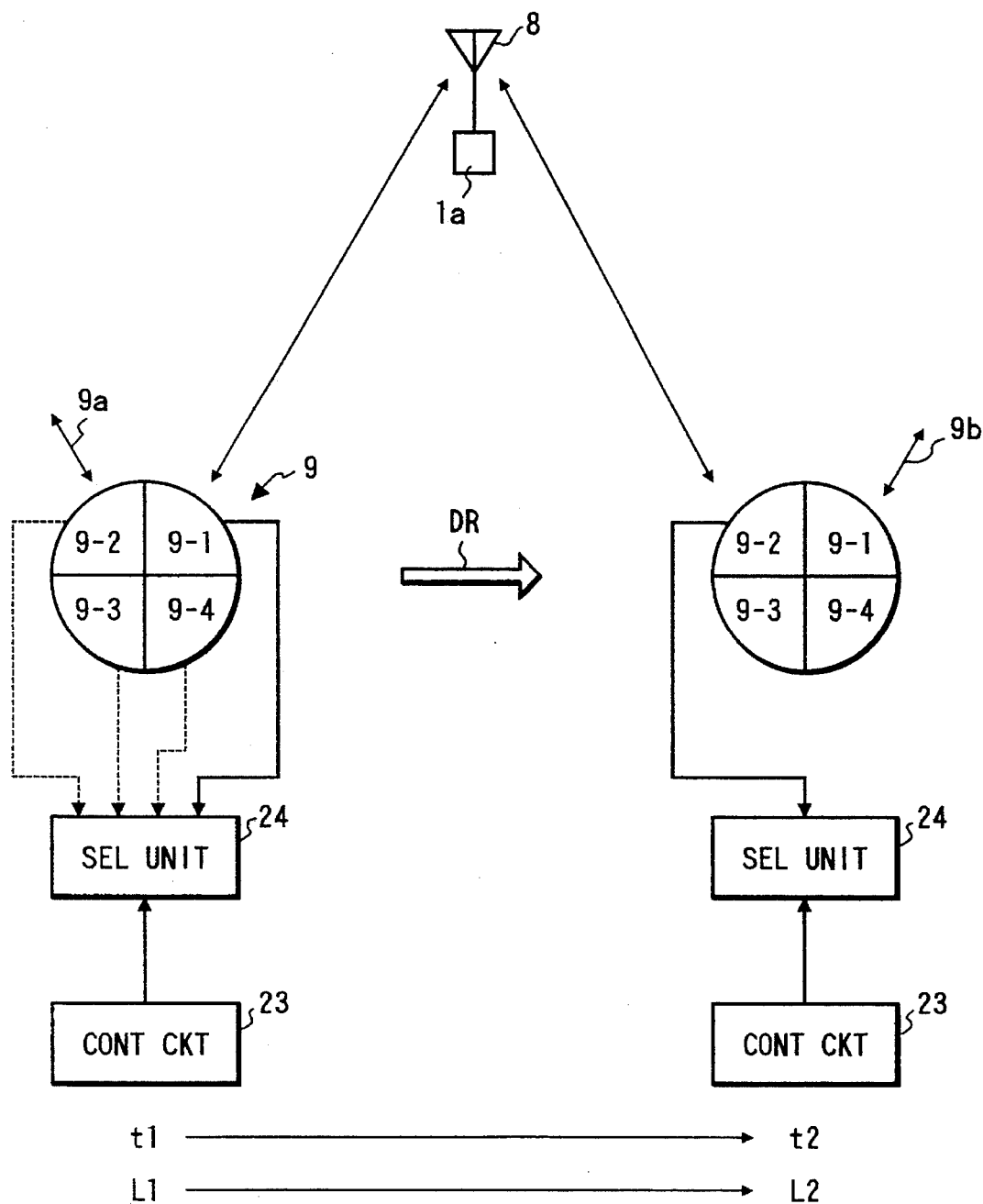
FIG. 9 is an illustration of the sixth embodiment showing a partial block diagram of a mobile unit and a positional relation between the base station and the mobile unit.

A fifth embodiment will be described with reference to FIGS. 1A, 1B, 6, 8, and 9. FIG. 8 is an illustration of the sixth embodiment showing a positional relation among the base station and mobile units. FIG. 9 is an illustration of the sixth embodiment showing a partial block diagram of a mobile unit 2-1 and a positional relation between the base station 1a and a mobile unit 2-1.

The base station 1a and mobile units 2-1 and 2-2 are located as shown in FIG. 8. That is, the base station 1a is a distance r1 away from the mobile unit 2-1 and a distance r2 away from the mobile unit 2-2 and the mobile unit 2-1 is a distance r3 away from the mobile unit 2-2. The control circuit 23 of a mobile unit 2-1 measures distances r1 and r2 using the spread spectrum technique and the control circuit 23' of a mobile unit 2-2 measures distances r2 and r3 similarly. The mobile unit 2-1 transmits the data of the distances r1 and r2 to the mobile unit 2-2 via the base satiation 1a and transmitting a request signal indicative of requesting data of distances r2 and r3. In response to the request signal, the mobile unit 2-2 measures and transmits the data of the distances r2 and r3 to the mobile unit 2-1 via the base satiation 1a wherein data of distance r3 may be omitted. The control circuit 23 of the mobile unit 2-1 receives the data of the distances r2 and r3 and then, it calculates the direction to the base station 1a therefrom. Similarly, the control circuit 23 of the mobile unit 2-2 receives the data of the distance r1 and then, it calculates the direction to the base station 1a therefrom. More specifically, the distance r1 (r2 and r3) is measured as follows:

The base station 1a transmits data to a mobile unit 2-1 at a first timing. The mobile unit 2-1 receives the data and returns the data to the base station 1a with a predetermined short delay. The base station 1a receives the returned data at a second timing and can determine the delay time due to the transmitting the data from the base station 1a to the mobile unit 2-1 and from the mobile unit 2-1 to the base station 1a by subtracting the predetermined short delay from the time difference time between the transmitting and receiving the data, namely, the first and second timings. The base station 1a can calculate the distance r1 using the delay timed due to the transmitting the data. Similarly, the mobile stations 2-1 and 2-2 can measure the distances. Here, it is necessary to match the time base of the base station 1a to that of the mobile unit 2-1 because if the time base of the mobile station does not agree with that of the base station, it is difficult to keep the predetermined short delay time in the receiving and transmitting operation for the returning of the data. Therefore, the chip synchronizing clock of the mobile unit 2-1 is controlled to matched to that of the base station 1a by the spread spectrum coding technique mentioned in the fourth embodiment.

The mobile unit 2-1 has the control circuit 23, selection unit 30 and an antenna unit 9 including four antennas 9-1 to 9-4 having directivity in the different directions which replaces the antennas 21a and 21b. The control circuit 23 of the mobile unit 2-1 changes the directivity of the antenna unit 9 to an antenna 8 of the base station 1a using a selection unit 30 such that a gain of the antenna unit 9 increases. That is, at a timing t1, the control circuit 23 operates the selection unit 24 to select the antenna 9-1 having a directivity 9b in the direction to the base station 1a at a location L1. If the mobile unit 2-1 moves in the direction DR, at a timing t2, the control circuit 23 operates the selection unit 30 to select the antenna 9-2 having a directivity 9a in the direction to the base station 1a at a location L2.

The controlling of the directivity of the antenna unit 9 is effected by controlling a plurality of antennas as mentioned and may be effected by an adaptive array antenna.

As mentioned above, according to this embodiment, a reliable communication is provided by measuring distance between respective moving units to determine the direction to the base station from respective mobile units and the base station and controlling the direction or directivity of the antenna 9 to reduce interference between a lot of moving units located with in the same cell.

Figure 10:
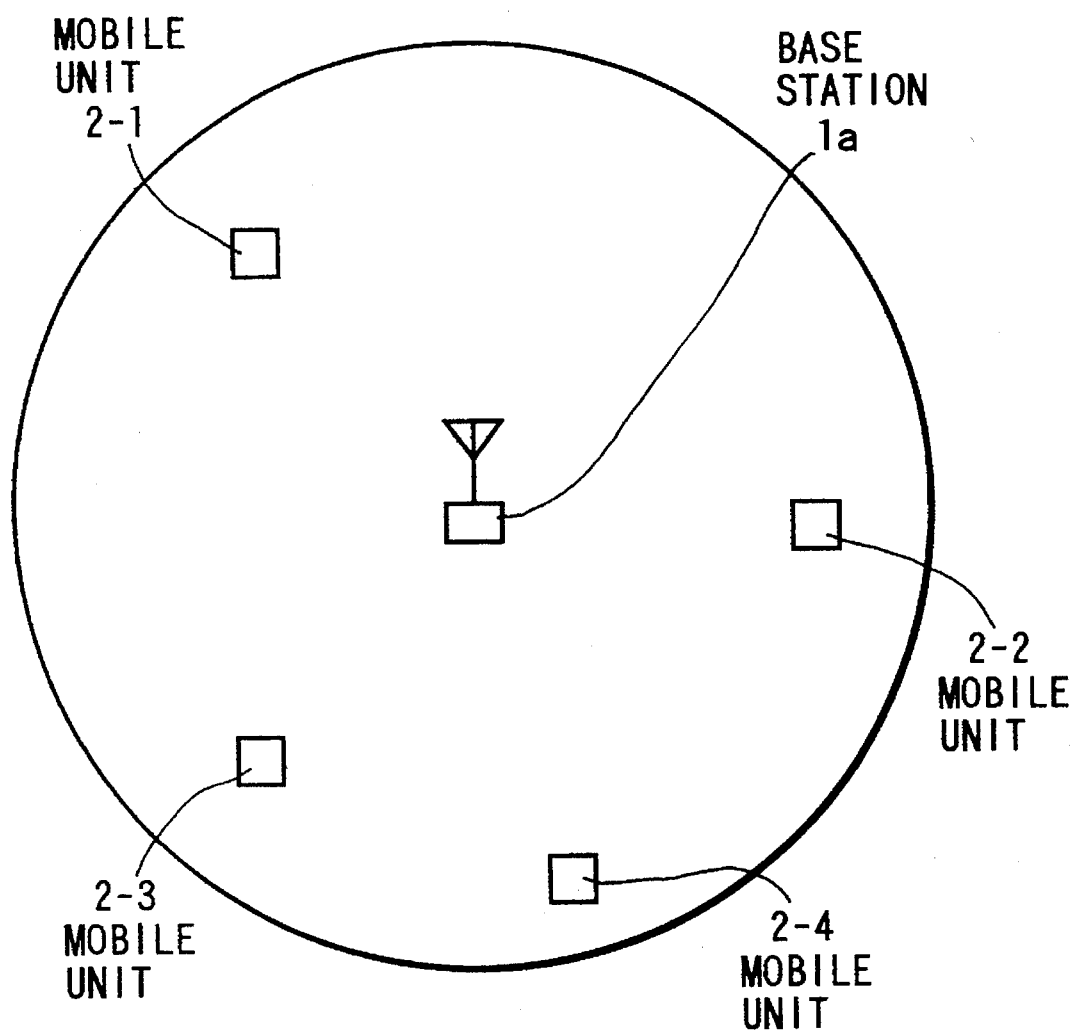
FIG. 10 is an illustration of the sixth embodiment showing the wireless data communication system wherein only cell A in FIG. 1A is represented.
Figure 11:
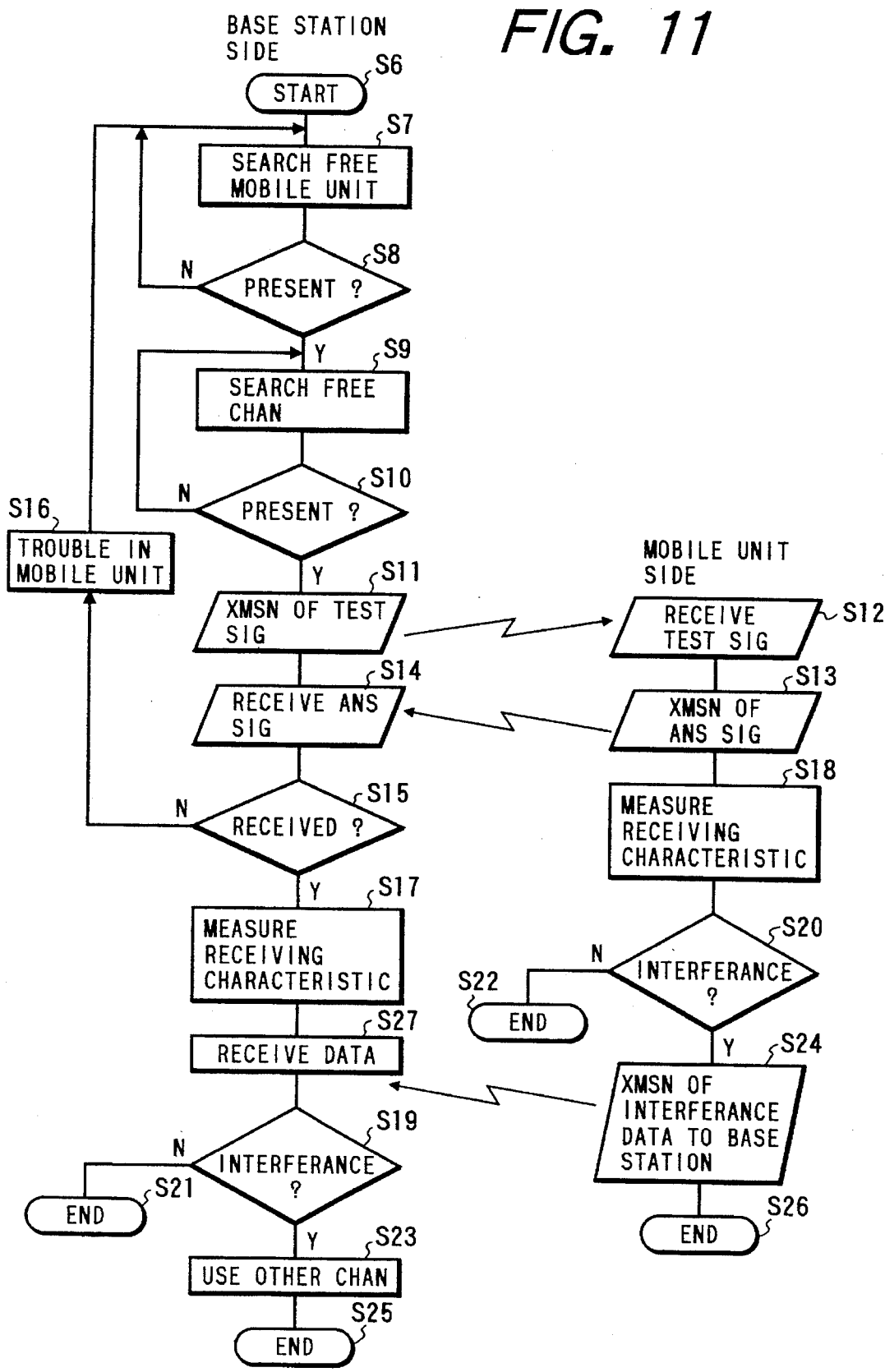
FIG. 11 shows a flow chart of the sixth embodiment.

A sixth embodiment will be described with reference to FIGS. 6, 10 and 11. FIG. 10 is an illustration of the sixth embodiment showing the wireless data communication system wherein only cell A in FIG. 1A is represented. FIG. 11 shows a flow chart of the sixth embodiment. The control circuit 25, comprising a microprocessor, effects an interference processing operation in accordance with the flow chart show in FIG. 11.

The control circuit 123 of the base station 1a, comprising a microprocessor having a memory 125, effects the interference processing periodically. In the first step s7, the control circuit 123 searches a mobile unit available for checking a channel condition. In step s8, if the answer is NO, processing returns to step s7 and if the answer is YES, processing proceeds to step s9. Here, it is assumed that a mobile unit 2-1 is available, or free. In step s9, the control circuit 123 searches a channel available for checking the channel condition. In step s10, if the answer is NO, processing returns to step s9 and if the answer is YES, processing proceeds to step s11. Here, it is assumed that the channel 2 is available or free. In the step s11, the control circuit 123 transmits a predetermined test signal to the mobile unit 2-1.

The mobile unit 2-1 receives the test signal in step s12 and in response to this, the control circuit 23 of the mobile unit 2-1 transmits a predetermined answering signal to the base station 1a in step s13.

The base station 1a receives the answering signal from the mobile unit 2-1 in step s14. In the following step s15, the control circuit 123 checks whether or not the answering signal is correctly received. If the answer is NO, processing proceeds step s16 where the control circuit 123 stores the information indicating that the mobile unit 2-1 has a trouble and returns to step s7. In the step s15, if the answer is YES, the control circuit 123 measures a receiving characteristic in step s17. The measurement of the receiving characteristic is effected by measuring an error rate of the received data by the control circuit 23. This measurement may be effected by an intensity detection circuit (not shown) of the received signal. For measurement of the error rate or the intensity of the received signal a predetermined data signal is transmitted.

On the other hand, the control circuit 23 of the mobile unit 2-1 also measures a receiving characteristic of the tested channel in step s18. In the following step s20, if there is no interference, processing ends in step s22 and if there is an interference, the control circuit 23 of the mobile unit 2-1 transmits interference data indicative of the presence of the interference to the base station 1a and ends this processing in step s26.

The control circuit 123 of the base station 1a receives the interference data in step s27 and in the following step s19, the control circuit 123 makes a decision as to whether or not there is an interference in the tested channel. If there is no interference, the processing ends in the step s21. If there is an interference, processing proceeds to step s23. In step s23, the control circuit 123 decides that the channel 2 is not available now, uses other channels and ends the processing in step s25.

As mentioned above, according to this embodiment, the base station 1a and the mobile unit 2-1 check the channel conditions periodically, so that a reliable communication between the base station and mobile units is provided. The base station transmits the predetermined test signal including a predetermined pattern data for measuring the channel condition to the mobile unit 2-1. The mobile unit 2-1 generates the answering signal corresponding to the test signal and transmits it to the base station. The base station 1a receives the answering signal and makes a judgement whether or not there is an interference in the channel under the test and whether or not the mobile unit 2-1 has a trouble.

Figure 12:
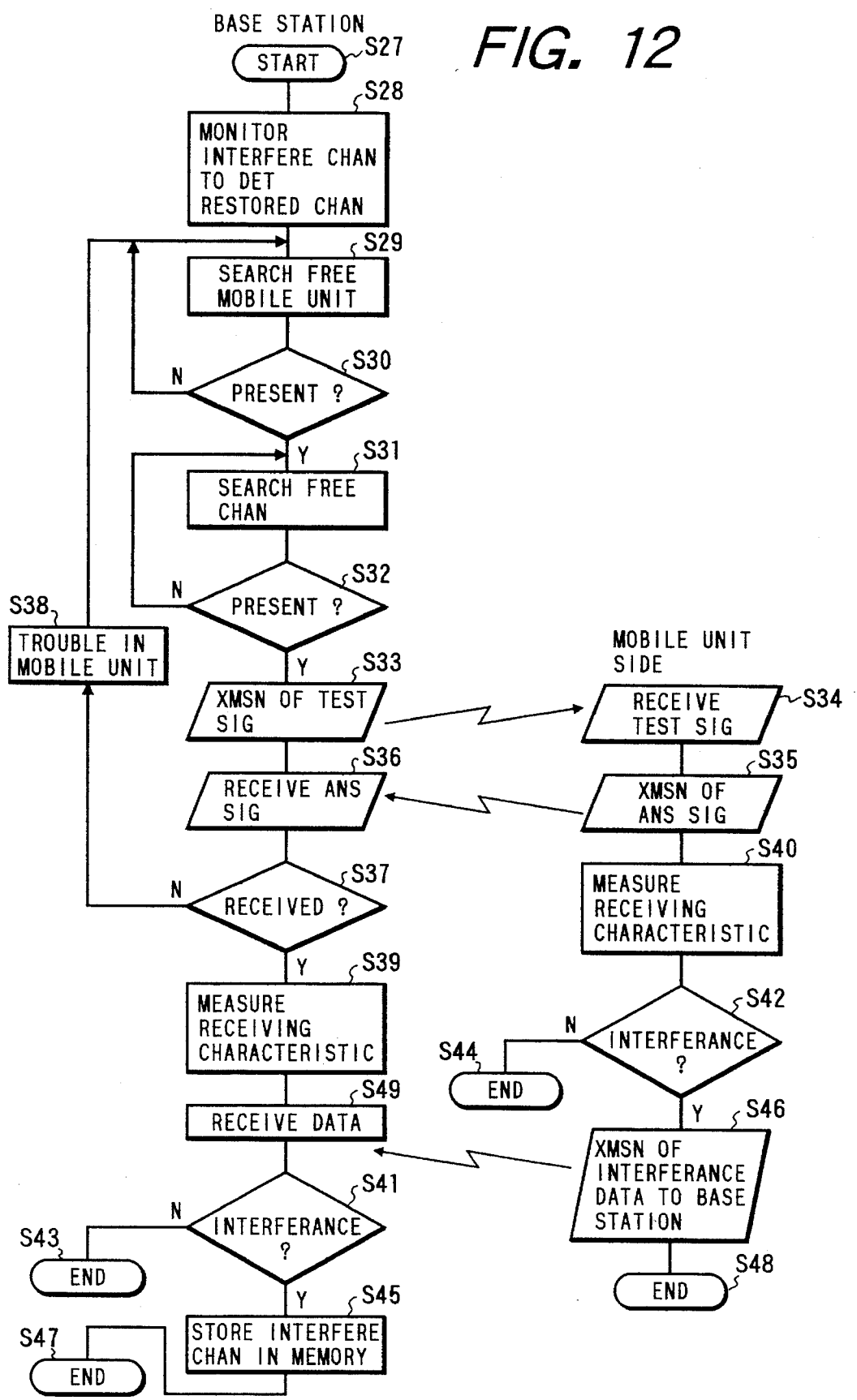
FIG. 12 shows a flow chart of the seventh embodiment.
Figure 13:
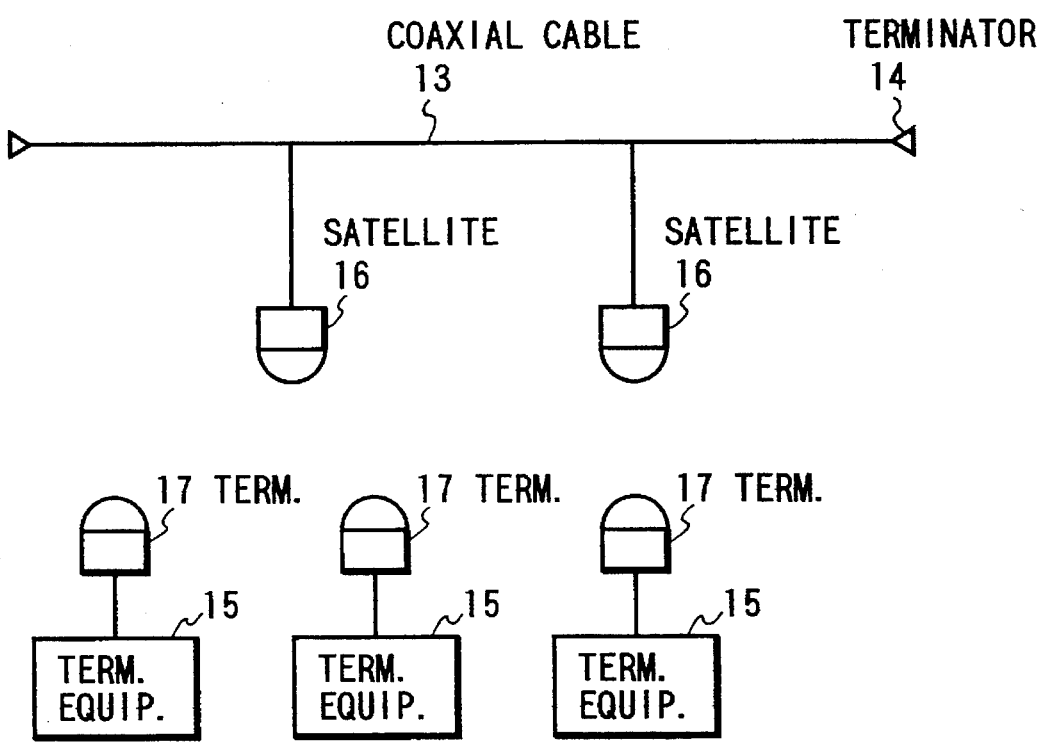
FIG. 13 is a block diagram of the prior art space transmission module.

A seventh embodiment will be described with reference to FIGS. 6, 10 and 12. FIG. 10 is an illustration of the seventh embodiment showing the wireless data communication system wherein only cell A in FIG. 1A is represented. FIG. 12 shows a flow chart of the seventh embodiment. The control circuit 123 shown in FIG. 6 effects an interference processing operation in accordance with the flow chart show in FIG. 12. The memory 125 is used to store data of a channel in which an interference was detected.

The control circuit 123 of the base station 1a, effects the interference processing periodically. In the first step s28, the control circuit 123 monitors the channel in which an interference was detected stored in the memory 125 and if there is no interference in that channel, that is, the channel is restored, the control circuit 123 renews the memory. That is, the data of the restored channel is erased.

In the following step s29, the control circuit 123 searches a mobile unit available for checking a channel condition. In step s30, if the answer is NO, processing returns to step s29 and if the answer is YES, processing proceeds to step s31. Here, it is assumed that a mobile unit 2-1 is available, or free. In step s31, the control circuit 123 searches a channel available for checking the channel condition. In step s32, if the answer is NO, processing returns to step s31 and if the answer is YES, processing proceeds to step s33. Here, it is assumed that the channel 2 is available, or free. In the step s33, the control circuit 123 transmits a predetermined test signal to the mobile unit 2-1.

The mobile unit 2-1 receives the test signal in step s34 and in response to this, the mobile unit 2-1 transmits an answering signal to the base station 1a in step s35.

The base station 1a receives the answering signal from the mobile unit 2-1 in step s36. In the following step s37, the control circuit 123 checks whether or not the answering signal is correctly received. If the answer is NO, processing proceeds step s38 where the control circuit 123 stores the information indicating that the mobile unit 2-1 has a trouble in the memory 125 and returns to step s29. In the step s37, if the answer is YES, the control circuit 123 measures a receiving characteristic in step s39.

On the other hand, the control circuit 23 of the mobile unit 2-1 also measures a receiving characteristic of the tested channel in step s40. In the following step s42, if there is no interference, processing ends in step s44 and if there is an interference, the control circuit 23 of the mobile unit 2-1 transmits interference data indicative of the presence of the interference to the base station 1a and ends this processing in step s48.

The control circuit 123 of the base station 1a receives the interference data in step s49 and in the following step s41, the control circuit 123 makes a decision as to whether or not there is an interference in the tested channel. If there is no interference, the processing ends in the step s43. If there is an interference, processing proceeds to step s45. In step s45, the control circuit 123 stores the data of the channel condition in the memory 125 and do not use this channel 2 and ends the processing in step s47.

As mentioned above, according to this embodiment, the base station 1a and the mobile unit 2-1 checks the channel conditions periodically to detects an interference in channels, so that a reliable communication between the base station and mobile units is provided. The base station transmits the predetermined test signal including a predetermined pattern data for measuring the channel condition to the mobile unit 2-1. The mobile unit 2-1 generates the answering signal corresponding to the test signal and transmits it to the base station. The base station 1a receives the answering signal and makes a judgement whether or not there is an interference in the channel under the test and whether or not the mobile unit 2-1 has a trouble and the result is stored in the memory and managed by checking the channel condition again and renewing the data in the memory 25 in accordance with the result of the checking the condition again.

What is claimed is:

1. A wireless data communication system comprising:

a plurality of base stations located to have cells arranged equidistantly therebetween respectively; and a plurality of mobile units, each being located within either of said cells, each of said base stations communicating with mobile units located within said either of said cells through a plurality of channels provided by frequency division multiplex;

wherein said each of said base stations comprises:

a control circuit for monitoring said plurality of channels and detecting a free channel; and a transmission circuit for continuously transmitting a signal including data indicative of a detected free channel detected by said control circuit.

2. A wireless data communication system, as claimed in claim 1, wherein said plurality of channels used in one of cells have predetermined frequency bands respectively which are the same as predetermined frequency bands in other cells.

3. A wireless data communication system, as claimed in claim 1, wherein each of said plurality of mobile units comprises a chip synchronizing circuit for effecting chip synchronizing between one of said plurality of base stations within which said each of said plurality of mobile units is located.

4. A wireless data communication system as claimed in claim 1, wherein each of base stations comprises a first spread spectrum coding modulation signal generation circuit for generating and transmitting a first spread spectrum coding modulating signal within respective channels and each of said plurality of mobile units comprises:

a transmitting and receiving unit for transmitting and receiving said spread spectrum coding modulation signal and changing a directivity of an antenna unit in receiving and transmitting said spread spectrum coding modulation signal, including:

a spread spectrum coding modulation signal demodulating circuit for demodulating said spread spectrum coding modulation signal; and a second spread spectrum coding modulation signal generation circuits for generating and transmitting a second spread spectrum coding modulation signal;

a measuring portion for measuring a first distance from one of said base stations in one of said cells and a second distance from one other of said mobile units within the same one of said cells within which said each of said plurality of mobile units is located using said transmitting and receiving unit;

means for transmitting said first distance to said one other of said mobile units through said signal, transmitting a request signal indicative of requesting a third distance between said one other of said mobile units and said one of said base stations in said one of said cells through said signal, and receiving said third distance through said receiving unit;

calculating means for calculating a direction of said one of said one of base stations in said one of said cells in accordance with said first and second distances and said received third distance; and means for controlling said directivity of the antenna unit in accordance with a calculated direction calculated from said calculating circuit.

5. A wireless data communication system, as claimed in claim 1, wherein each of said base stations comprises:

a detection portion for detecting an interference in one of said plurality of channels; and a control portion for controlling of using said plurality of channels such that a detected one of said plurality of channels is not used.

6. A wireless data communication system, as claimed in claim 5, wherein each of said base stations further comprises:

a memory for storing data indicative of said detected one of said plurality of channels, said control portion controlling said using said plurality of channels in accordance with said data stored in said memory;

a second detection means for detecting the absence of said interference in said one of said plurality of channels; and a second control means for renewing said data in said memory.

* * * * *